(No Model.)
J. STEWART.
BELT SHIFTER AND BRAKE.
No. 374,638. Patented Dec. 13, 1887.
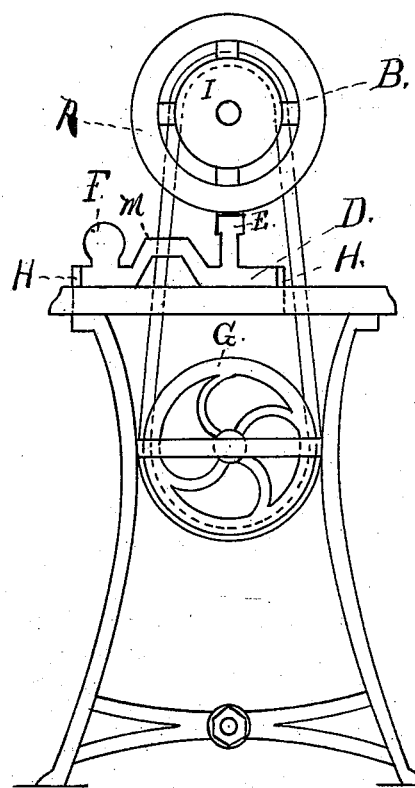
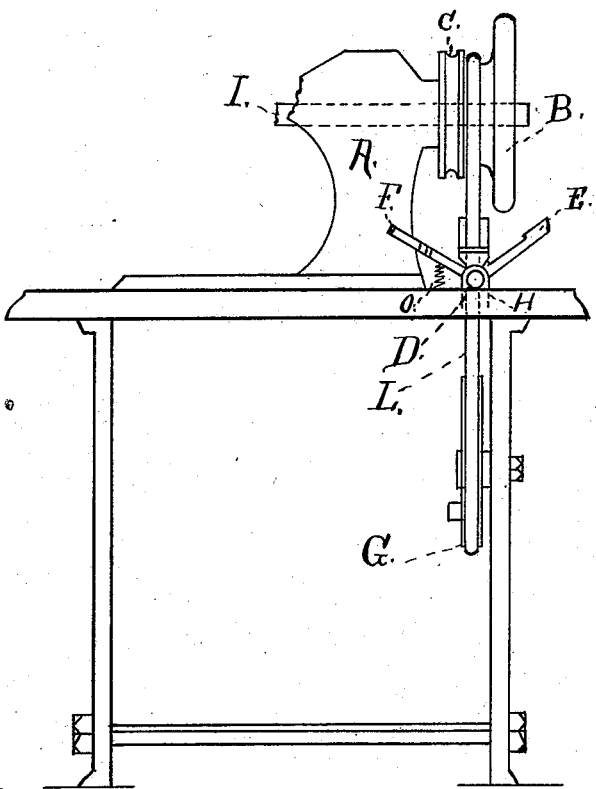
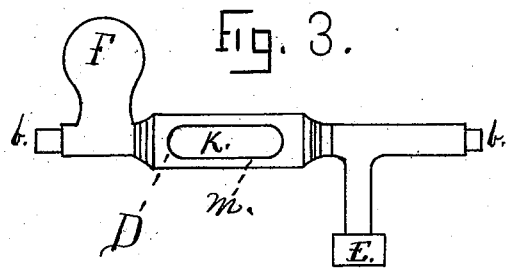
WITNESSES:
Albert Heusel.
A. C. Holloway
INVENTOR
John Stewart
BY
E. N. Thomas
ATTORNEY

UNITED STATES PATENT OFFICE.

JOHN STEWART, OF NEW YORK, N. Y.

BELT-SHIFTER AND BRAKE.

SPECIFICATION forming part of Letters Patent No. 374,638, dated December 13, 1887.

Application filed June 24, 1886. Serial No. 206,076. (No model.)

*To all whom it may concern:*

Be it known that I, JOHN STEWART, a citizen of the United States, and a resident of the city, county, and State of New York, have invented a new and useful Improvement in Belt-Shifters and Brakes, of which the following description, in connection with the accompanying drawings, is a specification, like letters on the drawings representing like parts.

Figure 1 is a side view of my improvement and an end view of the sewing-machine to which I apply it. Fig. 2 is an end view of my improvement and a side view of the sewing-machine to which I apply it. Fig. 3 is an enlarged top view of the brake and belt-shifter removed from the machine.

In using small machines of the kind shown the operator is often put to a great inconvenience in being compelled to let go of the work with one hand in order to stop or start the machine. I provide against this trouble by using a lever which is operated by the arm or elbow.

A, Figs. 1 and 2, represents an ordinary sewing-machine head and stand. The head is provided with a top shaft, I, to which the band-wheel B is fastened and on which the belt L runs while the machine is operated.

C is a loose pulley upon the shaft I, to which the belt L is shipped when it is desired to stop the operation of the machine.

G is a grooved band-wheel operated by a treadle and pitman. (Not shown.)

D, Fig. 1, is a side view of my brake and belt-shifter. In belting the machine the belt is passed through the hole K of the bent or raised part at M, Figs. 1 and 3. From the main part D, I extend an arm, F, and brake-arm E. When it is desired to shift the belt from one pulley to another, the operator presses down on the arm F, which throws the bent part K to the left, shipping the belt onto the loose pulley C, and at the same time the brake E is forced against the wheel B and stops it.

H H, Figs. 1 and 2, are staples which I use to secure the brake D to the table.

O, Fig. 2, is a spring for raising the lever F after it has been pressed down by the operator.

For convenience and cheapness I cast the device in one piece, as shown in Fig. 3, the parts b, b, F, and E being formed on the part D.

The operation is as follows: Place the belt as in Fig. 2, and when it is desired to stop the machine press down the lever F, which will swing the belt over into the groove of pulley C, and at the same time the brake E is pressed against the wheel B, stopping the machine, but allowing the wheel G, pulley C, and belt L to run. When the lever F is released, the belt is thrown back onto the pulley B and the brake E removed from pulley B by the spring O acting against the lever F.

Wheel G can be made large, so as to obtain a high speed, as it is not necessary to stop it.

I do not confine myself to the ordinary foot-treadle, but may use my device on other motion powers as well.

Having thus fully described my invention, what I claim as new, and desire to secure by Letters Patent of the United States, is—

1. The shaft I, loose pulley C, fixed pulley B, belt L, and wheel G, in combination with part D, having raised part M, hole K, and arms F and E, as and for the purpose specified.

2. The shaft I, loose pulley C, fixed pulley B, belt L, and wheel G, in combination with part D, having raised part M, hole K, and arms F and E, said part being secured in place by staples H H, as and for the purpose specified.

3. The shaft I, loose pulley C, fixed pulley B, belt L, and wheel G, in combination with part D, having raised part M, hole K, arms F and E, and spring O, made to release the brake from the wheel B and to raise the lever F, as and for the purpose specified.

In testimony whereof I have signed my name in the presence of two subscribing witnesses.

JOHN STEWART.

Witnesses:
  E. T. THOMAS,
  ALBERT HENSEL.